(12) United States Patent
March (10) Patent No.: US 7,356,505 B2
(45) Date of Patent: Apr. 8, 2008

(54) SYSTEM AND METHOD FOR TRANSFERRING FUNDS

(75) Inventor: Albert D. March, Etobicoke (CA)

(73) Assignee: Universal Transactions Systems Limited, Toronto (CA)

( * ) Notice: Subject to any disclaimer, the term of this patent is extended or adjusted under 35 U.S.C. 154(b) by 1209 days.

(21) Appl. No.: 09/874,042

(22) Filed: Jun. 6, 2001

(65) Prior Publication Data

US 2002/0016763 A1   Feb. 7, 2002

Related U.S. Application Data

(60) Provisional application No. 60/209,579, filed on Jun. 6, 2000.

(51) Int. Cl.
    *G06Q 40/00*   (2006.01)
(52) U.S. Cl. .......................................... 705/39; 705/43
(58) Field of Classification Search ................ 705/9, 705/39
    See application file for complete search history.

(56) References Cited

U.S. PATENT DOCUMENTS

| | | | |
|---|---|---|---|
| 4,745,265 A | | 5/1988 | Douno et al. |
| 4,912,310 A | | 3/1990 | Uemura et al. |
| 5,119,293 A | | 6/1992 | Hammond |
| 5,175,416 A | | 12/1992 | Mansvelt et al. |
| 5,461,217 A | | 10/1995 | Claus |
| 5,650,604 A | * | 7/1997 | Marcous et al. ............. 235/379 |
| 5,778,067 A | * | 7/1998 | Jones et al. ................... 705/65 |
| 5,844,218 A | * | 12/1998 | Kawan et al. ............... 235/380 |
| 5,857,079 A | | 1/1999 | Claus et al. |
| 5,857,152 A | * | 1/1999 | Everett ......................... 455/406 |
| 5,861,841 A | * | 1/1999 | Gildea et al. ........... 342/357.12 |
| 5,867,821 A | | 2/1999 | Ballantyne et al. |
| 5,933,136 A | | 8/1999 | Brown |

(Continued)

FOREIGN PATENT DOCUMENTS

WO   WO 90/13096   * 11/1990

OTHER PUBLICATIONS

Hansell, Saul. Tests of Electronic Purses May Bring End to Using Cash. Journal Record. Oklahoma City, Okla. Sep. 24, 1994. (4 pages).*

(Continued)

*Primary Examiner*—Kambiz Abdi
*Assistant Examiner*—Jennifer Liversedge
(74) *Attorney, Agent, or Firm*—Bereskin & Parr (57) ABSTRACT

A system and method for electronic transfer of cash or cash equivalent between a sender and a recipient includes an initiating regional office for initiating the transfer and which receives an amount of money to be electronically transferred from the sender and a verification ID protocol from the sender, an initiating authorization center for storing the amount and the verification ID protocol in an account database, a dispensing authorization center for communicating with initiating authorization center and a dispensing regional office. When the recipient provides the verification ID protocol to the dispensing regional office, a financial card is issued to the recipient containing funds equivalent to the amount initially prescribed by the sender. The system provides the sender with the ability to provide the receiver (at a remote geographical location) with a secure, anonymous, ATM compatible financial card having a particular preset monetary value even in the case where the recipient does not possess proper identification documents.

15 Claims, 7 Drawing Sheets

U.S. PATENT DOCUMENTS

| | | | |
|---|---|---|---|
| 5,963,647 A * | 10/1999 | Downing et al. | 705/39 |
| 5,978,919 A | 11/1999 | Doi et al. | |
| 6,006,988 A * | 12/1999 | Behrmann et al. | 235/379 |
| 6,014,748 A | 1/2000 | Tushie et al. | |
| 6,048,271 A * | 4/2000 | Barcelou | 463/48 |
| 6,105,009 A * | 8/2000 | Cuervo | 705/43 |
| 6,298,336 B1 * | 10/2001 | Davis et al. | 705/41 |
| 6,636,833 B1 * | 10/2003 | Flitcroft et al. | 705/1 |
| 2002/0022966 A1 * | 2/2002 | Horgan | 705/1 |
| 2002/0046341 A1 * | 4/2002 | Kazaks et al. | 713/182 |

OTHER PUBLICATIONS

"The TravelFunds Card from American Express", www.americanexpress.com, American Express Company, printed Aug. 4, 2004.

About Us—About First Data, www.westernunioncanada.ca/info/aboutUSFirstData.asp, printed Aug. 13, 2004.

"IPC Card Solutions", www.firstdata.com, First Data Corporation, printed Aug. 13, 2004.

"First Data Merchant Services", www.fdms.com, printed Aug. 4, 2004.

* cited by examiner

FIG. 1

INITIATION data packet

| t/f amount | initiating transit ID | dispensing transit ID | Initiation security ID | verification ID protocol |
|---|---|---|---|---|
| 30 | 32 | 34 | 36 | 38 |

AUTHORIZATION data packet

| t/f amount | initiating transit ID | dispensing transit ID | authorization security ID | verification ID protocol |
|---|---|---|---|---|
| 30 | 32 | 34 | 40 | 38 |

DISPENSING data packet

| t/f amount | initiating transit ID | dispensing transit ID | dispensing security ID | verification ID protocol |
|---|---|---|---|---|
| 30 | 32 | 34 | 42 | 38 |

CONFIRMATION data packet

| t/f amount | initiating transit ID | dispensing transit ID | confirmation security ID | verification ID protocol |
|---|---|---|---|---|
| 30 | 32 | 34 | 44 | 38 |

SYSTEM AND METHOD FOR TRANSFERRING FUNDS

This application claims priority from U.S. Provisional Patent Application No. 60/209,579 filed Jun. 6, 2000.

FIELD OF THE INVENTION

This invention relates generally to systems and methods for transferring funds and more particularly to systems and methods for electronic transfer of funds between a sender and a recipient.

BACKGROUND OF THE INVENTION

In the area of personal financial transactions, there are occasions when individuals have an acute need to send or receive cash quickly by rapidly transferring money from one location to another distant location. These situations range from individuals who want to provide funds to their dependents who are away from home to business travellers who require convenient access to funds in remote locations. Accordingly, the ability to easily and conveniently "wire" money to a remote location is extremely desirable for these individuals.

However, wire transfer of funds is a banking function which is not generally available to the general public. Typically, bank wire transfers cover very large amounts of money and are only suited for business transactions. Consequently, rather than going to a bank to wire transfer money, most individuals commonly wire money through other companies such as Western Union or through the American Express Company. Wire transfer costs for consumer-related transactions at these organizations or related banks are relatively high and there are significant transfer processing time delays. For example, the cost of using current "wire" transfer services to transfer funds internationally can be as high as $80 U.S. and can take as long as 3-4 business days.

Typically, to send money through a commercial "wire" transfer organization, a customer (hereinafter referred to as "sender") attends at an agent location and presents cash, cashier's check or a deposit from a recognized credit card in the amount of the funds to be transferred plus a service fee. The sender gives the agent the name of the person to whom the money is to be sent, and is issued a receipt. The agent then registers the transaction in the computerized system which allows the transferee (hereinafter referred to as "recipient") to pick up the funds by physically attending at an agent location and providing proper identification (valid driver's license or military ID). Another option for money transfer with commercially available is for a sender to call a toll-free telephone number and provide the answering agent the above-noted information. The funds to be transferred, together with an increased services fee, are typically charged to the sender's credit card as a cash advance.

There are a number of drawbacks to the money transfer processes described above. A recipient must find an agent location which is open, which can be difficult to do during non-business hours and which carries sufficient cash to complete the transaction. If the agent selected by the recipient does not have enough cash, the agent will offer to give the recipient some of the cash and a check for the remainder. Often this requires additional work on the part of the recipient to find some place that will cash the check. Also, the privacy of both sender and recipient is compromised because the transaction is dependent on sales agent interaction. In many instances, people prefer not to let others at a currency exchange or bank have any knowledge of their personal financial affairs and would prefer to maintain as much anonymity as possible during the course of the transaction. Finally, delays may occur as a result of agent transposition or typographical errors. Moreover, such a system is very labour-intensive and costly to operate in part due to the potential for employee theft of currency.

In an effort to overcome some of these disadvantages, electronic fund transfer systems have been developed to allow customers to easily transfer and receive funds between banking accounts. U.S. Pat. No. 5,175,416 issued on Dec. 29, 1992 to Mansvelt et al. discloses a method of transferring funds. A first "smart card" is linked to a first financial institution. The first smart card then debits an account held at the first financial institution and records a corresponding credit value in the first smart card. The first smart card is linked to a second, similar device so that the credit value in the first device is reduced and a corresponding credit value is recorded in the second device. The second device is then linked to a second financial institution and the credit value in the second device is reduced while a corresponding credit value is recorded in an account held at the second financial institution. The first and second devices each store at least a portion of a program which is run in a synchronized interactive manner between the first devices. While the recipient and sender in such a system does not have to be a direct customer of the particular bank, they do need to have a valid, identifiable account at another "linked" (or affiliated) bank. Using such fund transfer systems, a cardholder can wire money to a recipient's bank account anywhere within the banking system. The wire transfer automatically debits the sender's account and deposits the funds in the recipient's designated account.

Another recently developed electronic fund transfer technology relates to the Mondex™ system which allows a bank customer to transfer funds from a bank account to a financial card having a microcomputer chip that stores a cash value (i.e. a smart card). It is also possible to transfer cash value to and from these financial cards using a Mondex Wallet™ system. The system is intended to provide additional privacy than a credit card or debit card due to the fact that Mondex transactions are not reported centrally. However, users of the Mondex Wallet™ system require accounts with Mondex™ (i.e. it is a closed system). Also consumer protection groups have noted that the 16 digit PIN number that is associated with the card encodes the user's name, the name of the issuing institution and the assigned bank account. While this unique serial number identifier is used to establish "security" of transactions at the point-of-sale, it can also create an audit trail which can compromise the anonymity of the user's card.

Some of the disadvantages associated with these kinds of fund transfer systems relate to the fact that they are closed systems and require participants (i.e. sender and recipient) to have accounts with the organization or an affiliated organization. Moreover, a recipient still requires a card to get access to the transferred funds and the funds are transferred from account to account, rather than dispensing cash directly to the intended recipient. In many cases, a particular user will desire to transfer money to someone else (a child, for example) in a distant city where neither the user nor the child has an account, or in the case where the child in the distant city does not have an banking (ATM) card for that account. Also, in the case of a person who requires funds in an emergency situation, in such a case it is likely that the person is without means of transportation to get to the nearest wire transfer office and that they are not in possession of their identification papers (i.e. stolen).

Finally, business travellers generally require access to significant amounts of funds but do not wish to buy and carry travellers checks or large amounts of cash. Further, travellers cheques are sometimes troublesome to convert to cash and are not uniformly accepted by international vendors. The use of credit cards used abroad usually incurs relatively high transaction costs and often results in unfavourable currency conversion. Debit cards are of limited use globally due to lower rates of merchant acceptability. Even wire transfer are expensive, slow and still require the recipient to carry cash.

Accordingly, there is a need for a system and method for transferring funds which does not have the cost and processing time limitations that are commonly associated with traditional "wire" transfers, which offer business travellers a viable alternative to travellers cheques, credit/debit cards, and "wire" transfers, which will allow any person to instantly and electronically transfer currency to any other person even in the case where neither person has a preestablished financial account with the organization, and which will still take advantage of an existing ATM network.

SUMMARY OF THE PRESENT INVENTION

It is therefore an object of the present invention to provide an improved system and method for transferring funds.

In a first aspect, the present invention provides a financial transaction system for automated electronic transfer of funds comprising:
 (a) a receiving center for receiving a transfer request from a sender for a predetermined amount of funds;
 (b) a dispensing center linked to said receiving center for dispensing said predetermined amount of funds to the recipient; and
 (c) a financial card containing the predetermined amount of funds provide by the dispensing center to the recipient.

In a second aspect, the present invention provides a method for transferring funds comprising:
 (a) receiving from a sender a request to transfer a predetermined amount of funds;
 (b) generating a financial card containing the predetermined amount of funds; and
 (c) dispensing the financial card to a recipient.

In a third aspect, the present invention provides a financial transaction system for automated electronic transfer of funds comprising:
 (a) means for a receiving a transfer request from a sender for a predetermined amount of funds;
 (b) means linked to said receiving center for dispensing said predetermined amount of funds to the recipient; and
 (c) a financial card containing the predetermined amount of funds provided by the dispensing center to the recipient.

Further objects and advantages of the invention will become apparent from the following description.

BRIEF DESCRIPTION OF THE DRAWING FIGURES

For a better understanding of the present invention and to show more clearly how it may be carried into effect, reference will now be made, by way of example, to the accompanying drawings, which show a preferred embodiment of the present invention and in which.

DESCRIPTION OF THE PREFERRED EMBODIMENT

Figure 1:
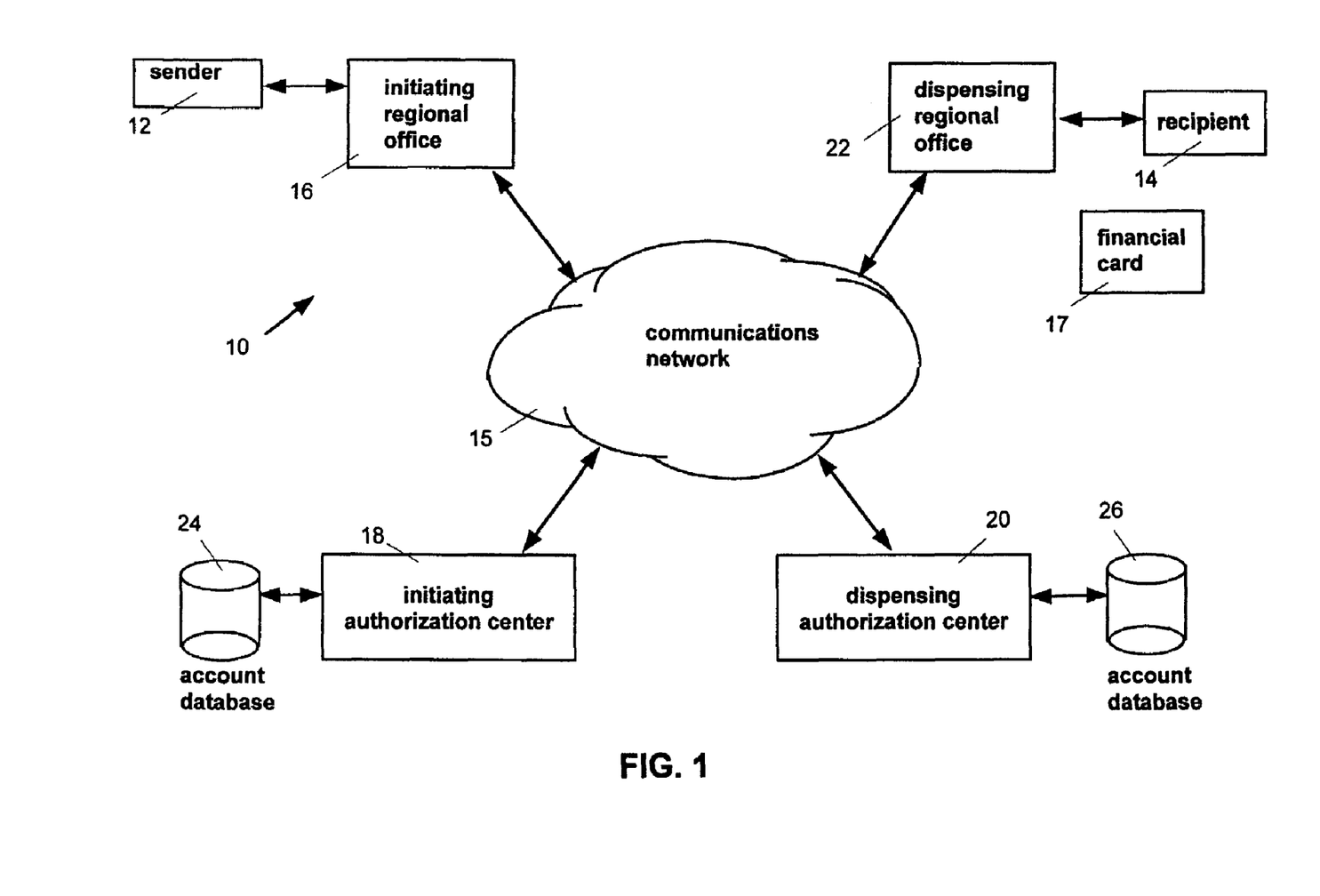
FIG. 1 is a block diagram of the general system architecture of a preferred embodiment of the fund transfer system of the present invention.

Reference is first made to FIG. 1, which shows a block diagram of fund transfer system 10 made in accordance with a preferred embodiment of the invention and which will be used for the purposes of describing the operational aspects of the invention.

Fund transfer system 10 allows a sender 12 to transfer funds to a recipient 14 over communications network 15 (i.e. a conventionally known ATM network such as INTERAC™ or CIRRUS™) through the use of Initiation Regional Office 16, Initiating Authorization Center 18, Dispensing Authorization Center 20, and Dispensing Regional Office 22, as will be described. Specifically, sender 12 initiates the fund transfer process, which if successful result in the issuance of a secure, anonymous, ATM compatible financial card having a particular present monetary value to recipient 14 for his or her own personal use. In respect of the implementation it should be understood that the cost to establish an electronic network similar to the existing ATM network is enormous. Thus, any solution to the problem must rely, to some extent, on the existing ATM network.

There are several ATM systems in existence in North America and around the word. These systems are interlinked such that an individual may travel to virtually any location and retrieve money from their account using a local ATM. The account is accessed by inserting a card in an ATM machine and supplying a preassigned Personal Identification Number (PIN). Upon verification of the PIN, the individual is provided access to their account and may withdraw funds therefrom. The ATM also allows individuals to perform various other transactions which normally requires the assistance of a teller. Such transactions include, for example, deposits, transfer of funds between accounts in the same bank, account balance, etc. The use of the ATM is facilitated by a keypad and various function keys. The keypad allows the user to enter specific numerical information, while the function keys allow quick responses to various questions or prompts. The individual is also provided with such conveniences as the selection of a preferred language for conducting the current session at the ATM.

Regional ATM networks (which are usually shared banking cooperatives) have been developed to permit bank customers to access any ATM in their local area. Users are no longer tied to their own bank's ATMs. The Cirrus and Plus ATM networks offer the same service on a national basis by linking required ATM networks. Fund transfer system 10 preferably requires no new hardware or software modifications to ATM communication systems. And, very importantly, unlike other home banking systems (which require specialized software or automated clearing house capability), the present invention requires little or no new software or operating procedural changes at a user's bank.

Sender 12 can be an individual, or alternatively can be an individual coupled through an intermediate agent (e.g. an affiliated store or commercial outlet) to Initiating Regional Office 16. It should be understood that sender 12 may alternatively present cash to an agent, if desired. Sender 12 may be without any local banking affiliation, such as a business traveller or a student away at school. In either scenario, such an individual would contact an agent and the agent would interact with fund transfer system 10 as if the agent were sender 12. It should be noted that neither sender 12 nor recipient 14 requires a card to activate the selected ATM or any financial institution affiliation whatsoever to receive the designated funds.

Initiating Regional Office 16 is typically a branch of a financial institution (e.g. banking or credit card company) that implements fund transfer system 10. Initiating Regional Office 16 can be fully automated, wherein Initiating Regional Office 16 includes a communications device (e.g. a modem) for receiving a communication from sender 12 requesting transfer of value and for verifying the availability of funds in the account of sender 12. Specifically, Initiating Regional Office 16 can also include a computer and appropriate software to run the modem, so that it can automatically receive sender's 12 request for a fund transfer and in response thereto telephone sender's 12 bank to verify the availability of funds in the customer's account. However, a person stationed at the control server apparatus could manually receive the customer's call and then manually phone the customer's bank.

Sender 12 is securely connected to Initiating Regional Office 16 using a conventionally known communications method (e.g. through an ATM machine or over the Internet). For example, the initiator could use a touch-tone telephone with a card reader via a voice response unit to access the system services of the present invention. It should be understood that the initiator could instead utilize an ATM, or a personal computer outfitted with the capability to access the system service of the present invention.

Regardless of the mode of communication between sender 12 and Initiating Regional Office 16 (telephone, personal computer, ATM, etc.), a financial card would generally be used to make funds available from a financial account corresponding to the card. Such card could be a credit card, debit card, smart card or stored value card. At this point, the funds to be transferred are held or pre-authorized as available and sender's 12 account is also debited the amount of the customary transaction or convenience fee (which is not be returned if the transfer is not completed). A convenience fee, which is ordinarily paid by sender 12, is charged for each money transfer transaction.

According to the preferred embodiment of the present invention, fund transfer system 10 requires sender 12 to provide a verification ID protocol (i.e. a question and answer sequence) which must either be communicated by sender 12 to recipient 14 contemporaneously with the fund transfer or which has been pre-arranged between sender 12 and recipient 14. Recipient 14 will need to complete the verification ID protocol in order to obtain the transferred funds from Dispensing Regional Office 22. It should be understood that since the present invention contemplates the situation where recipient 14 does not have personal identification papers and the like, it will be necessary to have a memorized or pre-arranged verification ID protocol in order to provide a desired level of fund release security. It should be understood that the verification ID protocol could be supplanted with, or substituted with, another type of security identification systems which recognize an individual's biological characteristic such as a signature, thumbprint, or retina scan, etc.

Figure 2A:
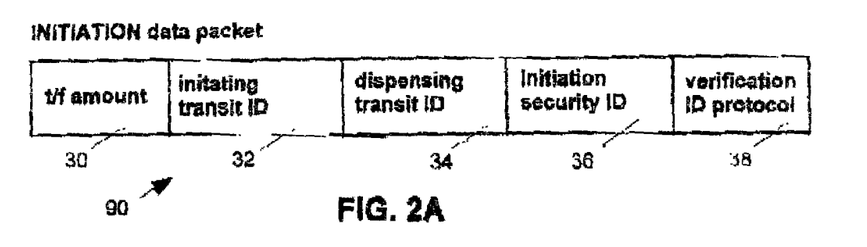
FIG. 2A is a schematic representation of the general data structure of the INITIATION data packet sent by the Initiating Regional Office to the Initiation Authorization Center of FIG. 1.

Upon verification, Initiating Regional Office 16 sends an INITIATING data packet 90 (as shown in FIG. 2A) to Initiating Authorization Center 18. As shown in FIG. 2A, Initiating Data Packet 90 contains data that represents the predetermined transfer amount 30, the initiating regional office transit number 32, the dispensing regional office transit number 34, an initiation security ID 36 and a verification ID protocol 38, which is an encoded version of the verification ID protocol (i.e. a question and answer sequence) provided by sender 12. It should be understood that initiation security ID 36 could be either the personal security ID of an employee working at Initiating Regional Office 16 or an automatically generated security ID based on the specific transfer transaction.

Figure 2B:
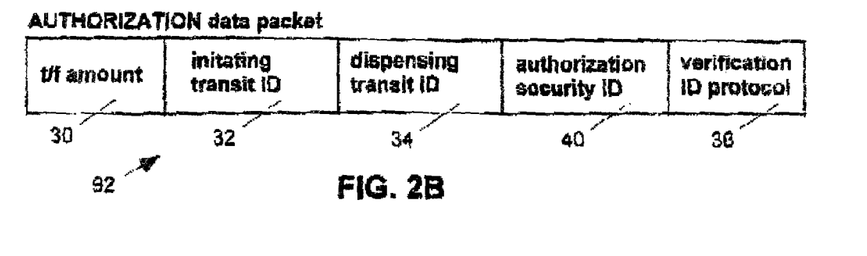
FIG. 2B is a schematic representation of the general data structure of the AUTHORIZATION data packet sent by the Initiating Authorization Center to the Dispensing Authorization Center of FIG. 1.

When Initiating Authorization Center 18 receives INITIATING data packet 90 from Initiating Regional Office 16, a supervisor (i.e. an employee or a virtual or mechanized process within Initiating Authorization Center 18) will confirm the predetermined transfer amount of monies being sent, the initiation security ID provided, and the dispensing regional office transit number. Once confirmation is generated, Initiating Authorization Center 18 will communicate with Dispensing Authorization Center 20 in the destination country or region over communication network 15 in the form of an AUTHORIZATION data packet 92 (as shown in FIG. 2B) which includes an authorization security ID 40. Data communication preferably takes place over an ATM or other digital communication network but could also take place in an analog form (e.g. by verbal communication over telephone, written communication in a fax, etc.)

Figure 2C:
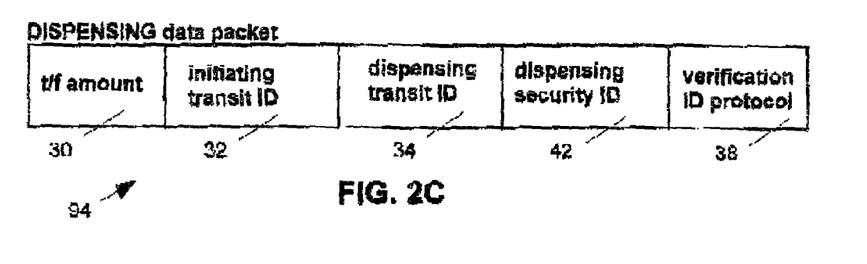
FIG. 2C is a schematic representation of the general data structure of the DISPENSING data packet sent by the Dispensing Authorization Center to the Dispensing Regional Office of FIG. 1.

Once Dispensing Authorization Center 20 receives the AUTHORIZATION data packet from Initiation Authorization Center 18, a supervisor there will confirm the authenticity of the authorization security ID and authorize the amount of money to be encoded into a financial card for recipient 14. Dispensing Authorization Center 20 will then send a DISPENSING data packet 94 (as shown in FIG. 2C) which includes a dispensing security ID 42, to Dispensing Regional Office 22. A supervisor at Dispensing Regional Office 22 will confirm the dispensing security ID and then proceed to wait for recipient 14 to collect funds in person.

Figure 2D:
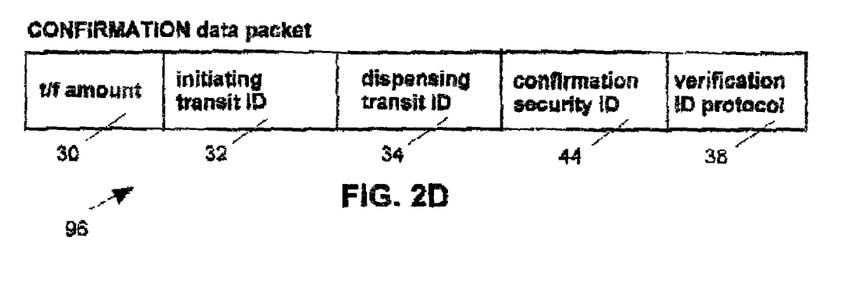
FIG. 2D is a schematic representation of the general data structure of the CONFIRMATION data packet sent by the Dispensing Regional Office to the Initiation Regional Office of FIG. 1.

In order to complete the fund transfer, recipient 14 attends at Dispensing Regional Office 22 which is typically a banking institution or an affiliated agent. It should be understood that Dispensing Regional Office 22 could also be an ATM or some other interactive terminal (e.g. tourist banking kiosk) which has electronic funds transfer capability as described herein. Assuming recipient 14 is able to complete the verification ID protocol (i.e. sender 12 has communicated same to recipient 14 or recipient 14 knows the answer to a unique commonly known question etc.), then Dispensing Regional Office 22 will send a confirmation communication to Initiating Regional Office 16 in the form of a CONFIRMATION Data Packet 96 (as shown in FIG. 2D) which includes a confirmation security ID 44. This will cause Initiating Regional Office 16 to obtain the funds (i.e. the principle funds along with any applicable international taxes, etc.) from sender 12 and to issue recipient 14 a financial card containing the predetermined amount of funds.

According to the preferred embodiment of the present invention, and further discussed below, Dispensing Regional Office 22 has been programmed to accept input from recipient 14 without recipient 14 needing to use a financial card of any type or to have a banking of financial account of any kind. As a result, recipient 14 interacts with Dispensing Regional Office 22, without using a card, to either provide the attending staff with the appropriate verification ID protocol or to activate the appropriate menus if Dispensing Regional Office 22 is an interactive terminal. If recipient 14 provides the appropriate verification ID protocol information that corresponds with that of the sender 12, recipient 14 will be issued a financial card which contains the predetermined amount.

The transfer of funds (or value) from sender's 12 account to the various system accounts of fund transfer system 10 is an electronic funds transfer that occurs through a conventional automated clearinghouse fund transfer process. However, it should be understood that the present invention is not meant to be limited to a particular mechanism or process for transferring funds from the customer's to the system's account, and any known method or conventionally used method could be just as easily utilized. Although, as telecommunications technology progresses, future fund transfer systems may also be applicable for use with the present invention, such as fund transfers through the Internet.

It should also be understood that all information transferred within the system is preferably conducted using known secure encrypted means (i.e. Microsoft Wallet using regularly changing code sequences) over the Internet and/or through proprietary banking networks. Also, confirmation and verification of payment information (e.g. user transit number, employment number, authorization codes) can be accomplished either directly or through a centralized call-in center.

Finally, it should be understood that Initiating Regional Office 16, Dispensing Regional Office 22, Initiating Authorization Center 18, and Dispensing Authorization Center 20 could all be contained within one physical entity or that any number of these could be combined into one physical entity or presence. Specifically, while it is contemplated that Initiating Authorization Center 18 and Dispensing Authorization Center 20 be located at geographically disparate locations, it is possible that they could be the same authorization center and located in tandem.

Figure 3:
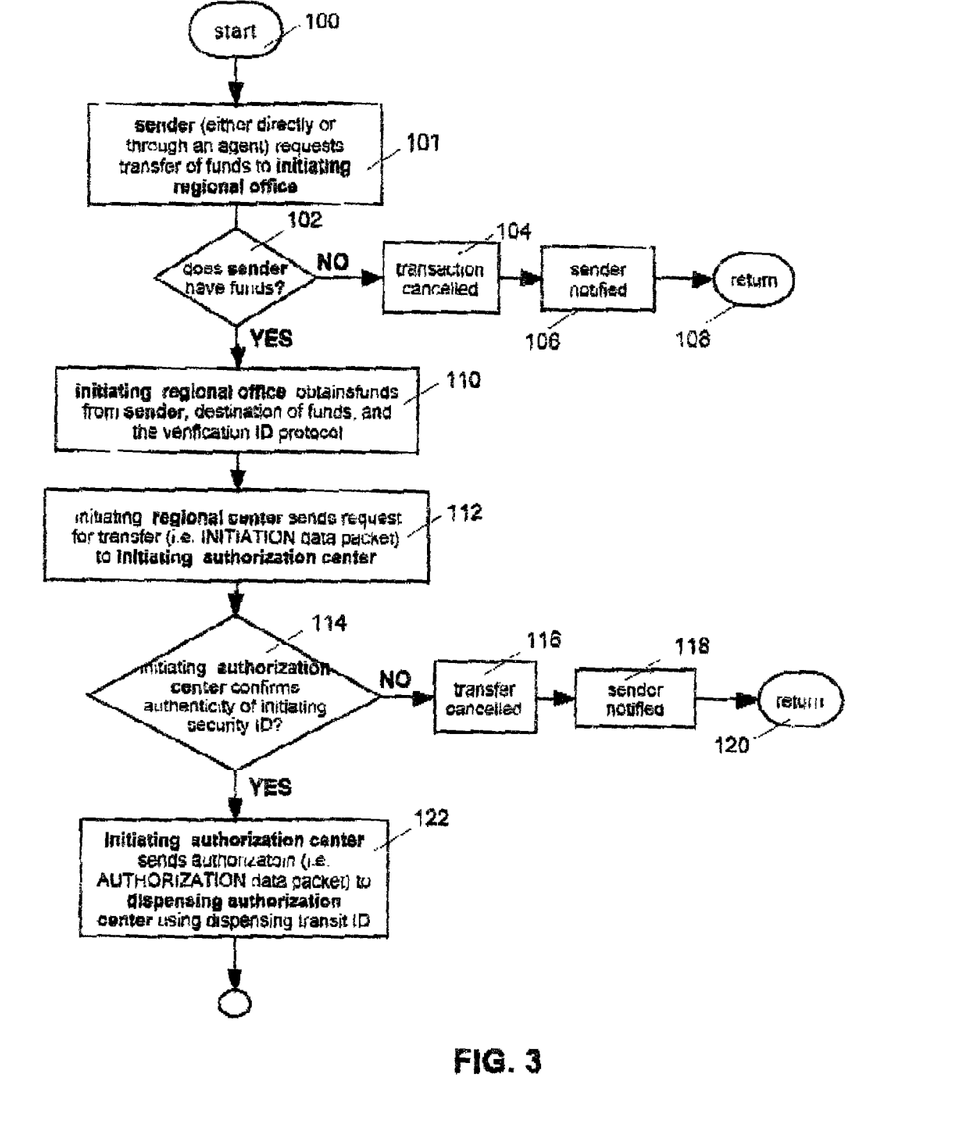
FIGS. 3, 4, and 5 are flow chart diagrams which illustrating one embodiment of a general process used to accomplish transfer of funds from the sender to the recipient over the fund transfer system of FIG. 1.
Figure 4:
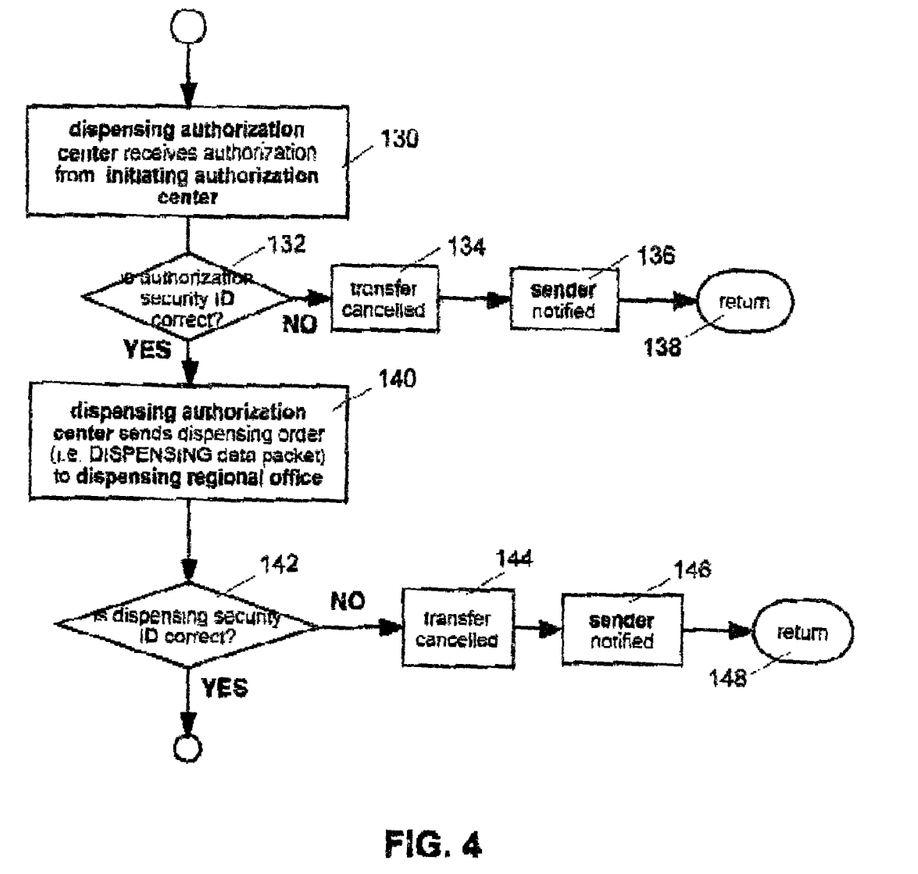
Figure 5:
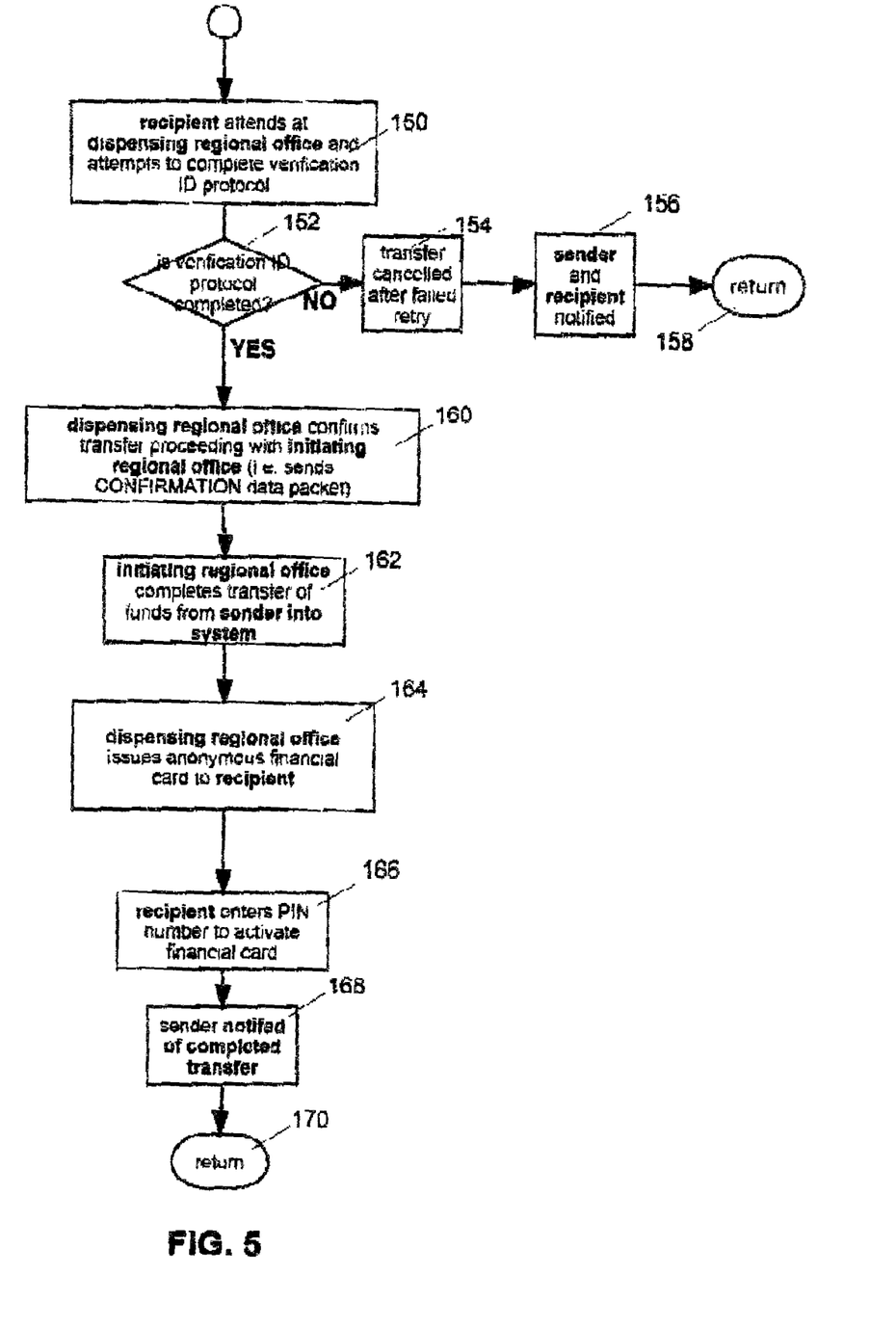

FIGS. 3, 4, and 5 are flow chart diagrams illustrating one embodiment of the general process steps used to accomplish transfer of funds from the sender 12 to the recipient 14 within fund transfer system 10.

Specifically, in FIG. 3 a transfer is first initiated (at step 100) by sender 12 who requests a fund transfer at Initiating Regional Office 16 (i.e. in person, through an intermediate agency or remotely by phone, fax, e-mail of other method of communication) (at step 101). Initiating Regional Office 16 checks to see whether sender 12 has available funds (i.e. funds plus applicable taxes etc.) for the transfer (at step 102) and if not cancels the transaction (at step 104), notifies sender 12 (at step 106) and returns (at 108). If sender 12 has sufficient funds to cover the transfer, Initiating Regional Office 16 puts a hold on the funds (i.e. holds funds in trust for sender 12), obtains a service fee which is not returned to sender 12 should the transfer fail at Initiation Regional Office 16 and obtains destination of funds and verification ID protocol from sender 12 (at stop 110) to authenticate the identity of recipient 14.

Initiation Regional Office 16 then sends a request (i.e. the INITIATION data packet 90 of FIG. 2A) to Initiation Authorization Center 18 (at step 112). This entails that a supervisor (e.g. a person or automated "virtual" supervisor) at Initiation Regional Office 16 provides an initiation security ID which can be generated by swiping an employee ID swipe card (i.e. a master key card) and entering the predetermined amount of funds to be transferred on a keypad (or in an computerized automated fashion by the "virtual" supervisor). Preferably, entered into the system computer database for transmission to Initiation Authorization Center 18 although the information could be e-mailed, phoned or faxed over secure phone lines (i.e. the existing secure e-mail, faxing line wire transfer services utilized by entities such as American Express and Western Union). It may also be prudent to have supervisor record this data into a physical location ledger or journal as backup.

The currency and validity of the various data entries in the INITIATION data packet 90 (most importantly the initiation security ID) is checked at Initiation Authorization Center 18 (at step 114). If this information is not confirmed then Initiation Authorization Center 18 cancels the transfer (at step 116), notifies sender 12 (at step 118) and returns (at 120). Otherwise, if the data in INITIATION data packet 90 is confirmed, Initiating Authorization Center 18 will send a data communication (i.e. the AUTHORIZATION data packet 92 of FIG. 2B) to Dispensing Authorization Center 20 (at step 122).

FIG. 4 illustrates a further series of general process steps which are executed within fund transfer system 10. One Dispensing Authorization Center 20 receives AUTHORIZATION data packet 92 from Initiating Authorization Office 18 (at step 130), Dispensing Authorization Center 20 checks to see whether all of the data is correct and in particular checks the validity and currency of the authorization security ID (at step 132). If any of this information in incorrect, then Dispensing Authorization Center 20 cancels the transfer (at step 134), notifies sender 12 (at step 136), and returns (at step 138).

If the AUTHORIZATION data packet 92 is confirmed to contain correct information, Dispensing Authorization Center 20 then sends a dispensing order (i.e. by forming and sending DISPENSING data packet 94 including dispensing security ID) to Dispensing Regional Office 22 (at step 140). Dispensing Regional Office 22 then determines whether the dispensing security ID is correct (at step 142) and if not then Dispensing Regional Office 22 cancels the transfer (at step 144), notifies sender 12 (at step 146), and returns (at step 148).

FIG. 5 illustrates a further series of general process steps which are executed within fund transfer system 10. If the DISPENSING data packet 94 is confirmed correct, then Dispensing Regional Office 22 will update its local computer records to indicate that a fund transfer is pending for intended recipient 14. Recipient 14 then attends at Dispensing Regional Office 22 (at step 150) and attempts to complete the verification ID protocol (which can potentially include but does not necessarily require the provision of personal identification papers). It should be noted that the pendency of a prospective transfer to recipient 14 can be held for a preset period of time and that while the prospective transfer is being held in the system, regular checks are conducted by fund transfer system 10 to ensure that sender 12 has the requisite funds available for transfer.

Dispensing Regional Office 22 then checks to see whether recipient 14 can successfully complete the verification ID protocol provided by sender 12 (at step 152) and if not then Dispensing Regional Office 22 cancels the transfer (at step 154), notifies sender 12 and recipient 14 (at step 156), and returns (at step 158). If so, then Dispensing Regional Office 22 confirms that the fund transfer is proceeding with Initiating Regional Office 16 by sending a CONFIRMATION data packet 96 (at step 160). In response, Initiating Regional Office 16 obtains the requisite funds (i.e. the principle funds plus any applicable taxes) from sender 12 (at step 162).

Dispensing Regional Office 22 then issues a secure, anonymous, ATM compatible financial card 17 having a particular preset monetary value to recipient (at step 164) using conventionally known card issuance techniques. Finally, recipient 14 selects a unique PIN number (made up at the time of issue) for future user and security purposes (at step 166). The card is then activated and serves as a pre paid ATM compatible credit/debit transaction card for recipient 14. Once the transfer has been completed, fund transfer system 10 notifies sender 12 of the completion of the fund transfer (at step 168) and returns (at step 170).

As recipient 14 uses financial card 17, fund transfer system 10 utilizes a bookkeeping functionality to keep track of usage and to deduct the appropriate amounts so that the amount of value transferred from financial card 17 does not exceed the predetermined amount stipulated by sender 12. Generally, financial card 17 would be issued in an "open format", but it could also be possible to issue financial card 17 in pre-set denominations. Initiating Authorization Center 18 and Dispensing Authorization Center 20 utilize the bookkeeping mechanisms that are already used by the major credit card companies. It is contemplated that fund transfer system 10 would simply be "built into" an existing credit card facility for purposes of accounting. The addition of fund transfer system 10 to an existing credit card operation would allow for the extension of fund transfers to potential clients who do not hold a credit or related bank account.

Specifically, the standard principles of credits and debits are utilized by Initiating Authorization Center 18 and Dispensing Authorization Center 20 for the purpose of reconciliation into the internal account balancing and records of fund transfer system 10. Typically, a deposit slip for monies received or a copy of receipt for monies received accompanies the actual cash or certified cheque at the bank or office of Initiating Regional Office 16. The same paper work is kept along with the data entered into the account databases 24 and 26 at Initiating Authorization Center 18 and Dispensing Authorization Center 20, respectively. This is done to keep accurate track of each usage of any issued card, and will act as a backup to the actual cards and supporting operating programs that each financial card 17 is programmed to interact with during the course of use by the user. Similar or supporting paper work is kept at the Initiating Regional Office 18 and at the Receiving Regional Office 16 where recipient 14 is issued financial card 17. It should be understood that it is possible that financial card 17 could be used for purposes of refunds of purchases by recipient 14 just as with any other standard credit card transaction. It is also contemplated that financial card 17 could be of a rechargeable format (i.e. for the life span of the associated card hardware) to allow recipient 14 to continually use for regular recharging purposes (i.e. monthly allowance or government payments, etc.)

Figure 6:
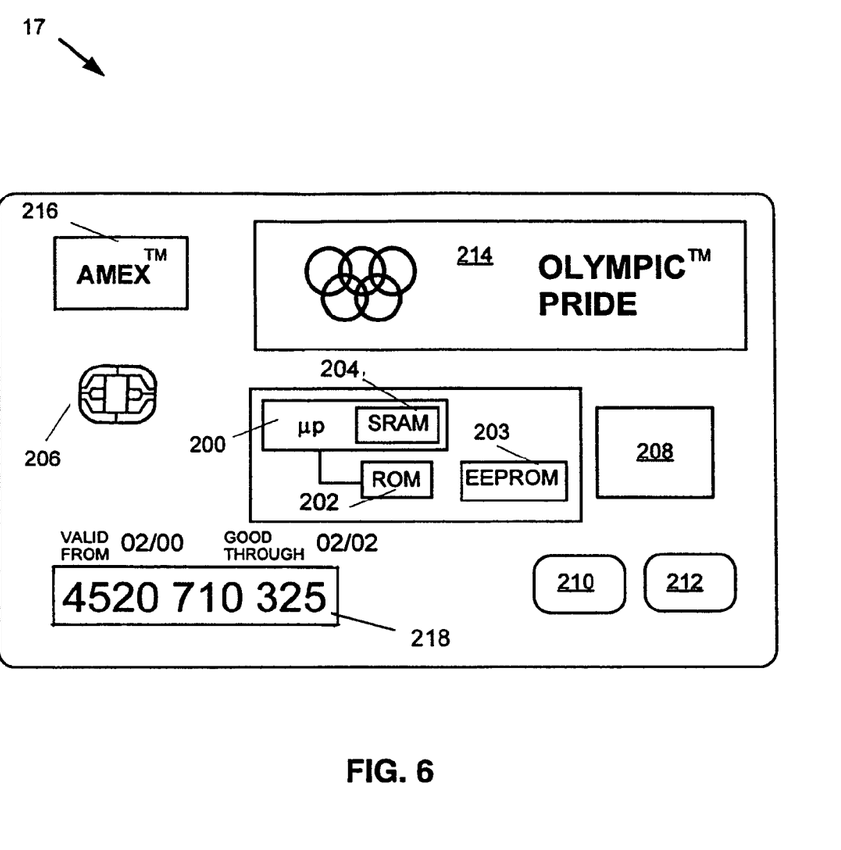
FIG. 6 is a schematic drawing showing the top view of the financial card of the fund transfer system of FIG. 1.

FIG. 6 depicts one side of a preferred embodiment of financial card 17 wherein financial card 17 is a smart card. Smart cards are credit card sized devices with on-board computer chips that provide a user with the ability to carry digital cash on the chip and with the card. Smart cards are extremely convenient for various commonplace commercial financial transactions since they eliminate the need for immediate cash, and they also eliminate associated problems like making change, processing coins, as well as the potential for vandalism and fraud. While the preferred embodiment of financial card 17 is a smart card, it should be understood that various other types of cards (i.e. debit/credit or value cards) could be used.

The development of such convenient financial instruments has also produced "smart cards" which are especially popular in Europe. Rather than employing information encoded on a magnetic strip, smart cards incorporate a microprocessor which is embedded in the card and can interact with the ATM or merchant terminal to provide information about the cardholder or the cardholder's account, transaction authorization, or other information. The wire transfer smart card disclosed in U.S. Pat. No. 5,461,217 to Claus for "Secure Money Transfer Techniques Using Smart Cards" and the smart card design and card to system interface applications described in U.S. Pat. No. 5,044,218 to Kawan et al. for "Method and System for Using an Application Programmable Smart Card for Financial Transactions in Multiple Countries" are incorporated herein by reference.

Referring back to FIG. 6, financial card 17 includes an ISO 7815 interface 208, a hologram 208, buttons 210 and 212, and LCD Screen 214, and an advertisement placement space 216. Financial card 17 displays various menus on the LCD Screen 214 and recipient 14 may select menu options and provide other input to financial card 17 through the buttons 210 and 212. Finally, a specific anonymous card number can be printed on a card number space 218. It should be understood that this is just one possible interface and that many other types of user interfaces are possible.

It is contemplated that advertisement placement space 216 on financial card 17 could be used to provide either the logo of the issuer (i.e. a major credit card company) or the logos of an affiliated organization (e.g. NBA™, OLYMPIC™ sponsorship, etc.) with similar layout to standard issued credit cards. Sponsorships could be established to offset associated costs (i.e. ATM fees) for certain individuals (e.g. seniors). It should also be understood that the specific functionality of financial card 17 will depend on which internal network interfacing software is used (i.e. where it should be an INTERAC™ and/or CIRRUS™ compatible card) and that is could be possible to include a magnetic strip on the back of financial card 17 for additional functionality.

Financial card 17 has a thin sheet material body with an approximate length and width of a standard credit card or smaller for user convenience. However, unlike conventional credit cards, financial card 17 has a microprocessor 200 (shown in dotted outline) implemented by a 32-bit, 5 MHz IBM RISC processor with 5V DC generator manufactured by IBM. Storage of program instructions and other static data is provided by read only memory (ROM) 202 (preferably 96 kilobytes ROM) and EEPROM 203 (preferably 64 kilobytes EEPROM) while storage of dynamic data is provided by a random access memory (SRAM) 204 (preferably 5 kilobytes SRAM) All memory units 202, 203 and 204 are accessed by microprocessor 200 using a 32-bit PCI bus interface and a high-speed USB interface is also provided It should be understood that microprocessor 200 may be implemented by any commercially available programmable/memory devices having suitable memory, speed and dimensions for use within financial card 17.

Microprocessor 200 is programmed to implement data processing which complies with the Federal information Processing Standards (FIPS) namely FIPS 140-1, Level 3. Microprocessor 200 also contains a fast math coprocessor (4096-bit modules) and is programmed to implement various encryption algorithms such as DES, Triple DES and Skipjack as well as key exchange algorithms RSA, Diffie-Hellman, KEA. Microprocessor 200 also provides symmetric and asymmetric key generation on card and supports various cryptographic algorithms including RSA, DSA, DES, Triple DES, SHA-1 and MD5. The specific encryption and key generation techniques utilized by financial card 17 are selected according to the type of specific security concerns associated with implementation and operational speed requirements.

For example, in respect of providing an appropriate signature algorithm for financial card 17, it has been determined that while DES and Triple DES algorithms provide high speed encryption and decryption, they are too insecure for proper use in association with financial card 17, especially where financial card 17 is used over large scale public communication networks. Accordingly, the RSA key exchange algorithm is preferably used to provide an adequate level of security. As conventionally known, the RSA key exchange algorithm utilizes public and private key pairs which are both very large prime numbers. The RSA algorithm is based on the difficulty of factoring the product of these two large prime numbers. The public key consists of a modulus m and a public exponent e. The private key consists of the same modulus m and a private exponent d. The two keys are generated from two randomly chosen large prime numbers p and q according to the relation:

$$m=pq$$

For security reasons, the lengths of these two numbers are equal. A modulus size of 1024 bits is considered to offer a reasonable level of security for applications like digital signatures. After further conventionally known calculations, factoring e and introducing x as plaintext and y as ciphertext, the formulas for encryption and decryptions are:

$$y =xe \bmod m \text{ and}$$

$$x =yd \bmod m, \text{ respectively.}$$

Figure 7:
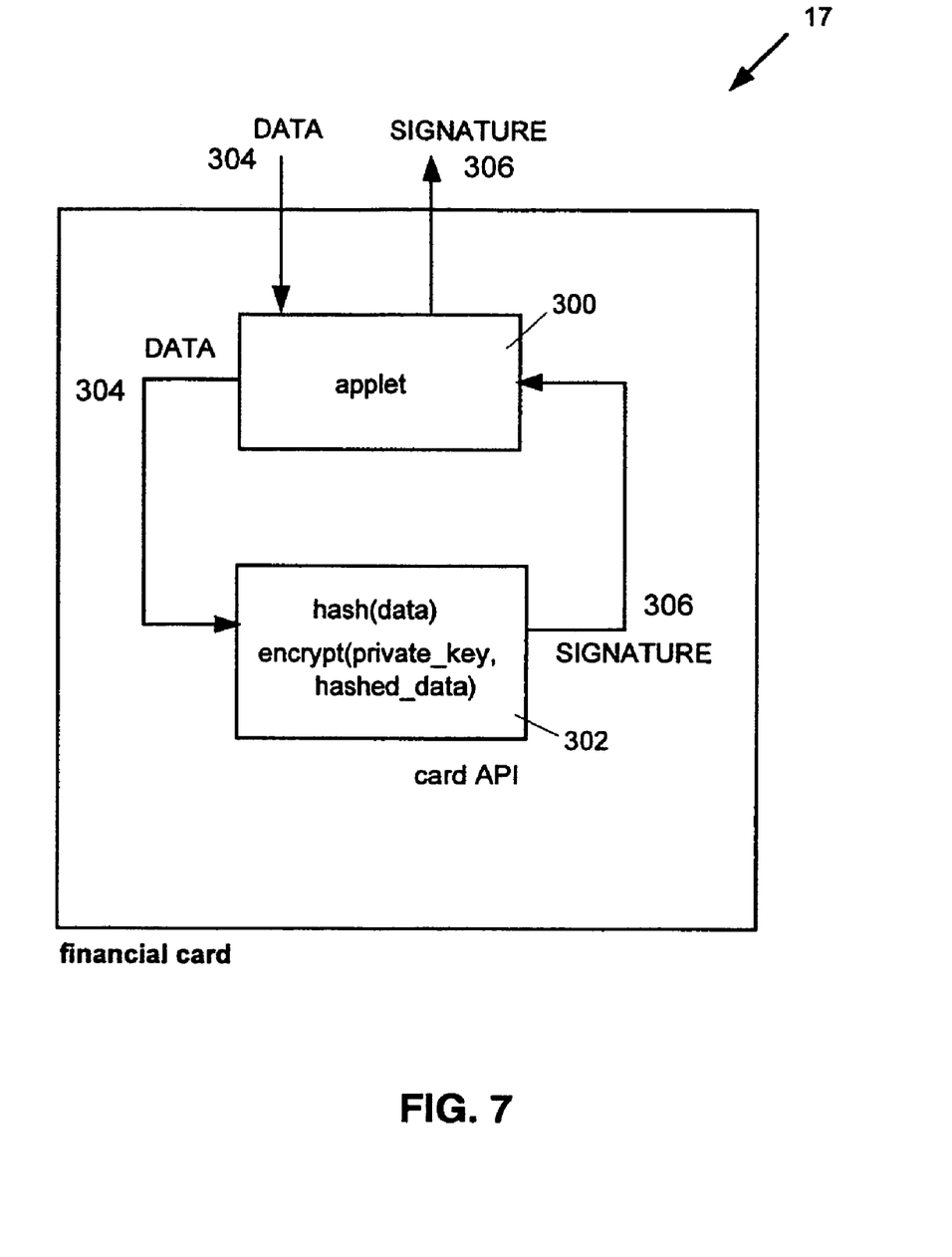
FIG. 7 is a schematic drawing illustrating the signature generation process utilized by the financial card of the fund transfer system of FIG. 1.

In order to check signature using the public key, a rough form of "decryption" is utilized. The result of the process is not true decryption but a "hash" (i.e. where hash is generally understood as a digital algorithm or fingerprint of data which ensures authenticity) of the original data in the byte array. Since the "hash" cannot be "unhashed", the original message is hashed. If the hash of the original message matches the "decrypted" hash then the public key is associated with the private key. FIG. 7 illustrates how microprocessor 200 generates a SIGNATURE for financial card 17 using the conventionally known secure hash algorithm (SHA). A Java applet 300 hashes a DATA message 304 and then passes DATA message 304 to a card API 302 as shown. The card API 302 then encrypts the hashed DATA message using the private key along with the hashed data as shown and returns a SIGNATURE message 306 to applet 300. Applet 300 in turn provides SIGNATURE message 306.

Financial card 17 also utilizes commercially available programs which offer a high degree of protection against tampering and reserve engineering attacks. The Cloakware™'s program translation tool, or encoder, works at the source code level, allowing microcontroller 200 to perform deep structural transformations to on-card software to generate a secure or "cloaked" program. The Cloakware program cascades into a failure mode which inherently limits the usefulness of any changes made to the operating software and deters potential coding intervention.

Also, transport layer security (TLS) is used to secure privacy and data integrity of messages, during client-server communication (i.e. while data is being exchanged between two communicating parties over a non-secure network such as the Internet). As is conventionally known, the TLS protocol consists of several layers, the lowest being the TLS Record Protocol and the highest being the TLS Handshake Protocol. This level of security is especially necessary when financial card 17 is utilized within e-business applications (e.g. on-line transactions). Security can be further enhanced by enabling the applicable server to send a CertificateRequest during the Handshake Protocol, requiring the client to send a CertificateVerify message to the server.

In summary, fund transfer system 10 provides individuals with the ability to remotely authorize the issuance of a financial card to another individual at a geographically remote location and for recipient 14 to select a unique PIN number to activate a secure and fully operational financial card 17. Since fund transfer system 10 allows sender 12 to provide recipient 14 with funds even if recipient does not have personal identical papers or an active financial account. It does not have the practical limitations associated with traditional "wire" transfers.

Since financial card 17 can be issued to recipient 14 without requiring authentication other than the verification ID protocol (i.e. a specific question answer sequence provided by the sender 12) recipient 14 is provided with an fully anonymous negotiable instrument at the time of issue while eliminating the trail of data in the course of usage of financial card 17 which is typically left by consumers every time a credit card is used to purchase an product or service.

Also, recipient 12 will find financial card 17 more convenient to carry than cash or travellers cheques and near instantaneous receipt of funds can be achieved within system 10 Recipient 12 will be able to use financial card 17 within pre-existing merchant account systems already setup to accept credit/debit payment (e.g. MasterCard, Visa, American Express, Diners Club etc.) Also, the explosion of consumer purchases over the Internet has created a substantial need for a financial card which do not expose consumers to the danger of having credit card information stolen over the Internet and which can be used for both Internet and non-Internet transactions.

Further, the simplicity of fund transfer system 10 lends itself to lower operational costs and reduced operator errors in comparison to those of conventional fund transfer systems such as "wire" transfer services. Other systemic advantages for the issuer include the absence of the need to determine the level of credit risk through a credit check for sender 12 or recipient 14. Also there is no need for special or complicated installations at merchant/client locations. It is contemplated that fund transfer system 10 could operate in a completely automated fashion within a conventional ATM network (i.e. without human operators) which would allow recipient to receive a preprogrammed financial card 17 anywhere that an ATM machine is located and further reduce operational costs and operator error.

From an issuer's financial market point of view, fund transfer system 10 provide the ability to increase profits from currency exchange when user's adopt fund transfer system on a large scale. Further, profits could be made from charging recipient 14 a flat fee for the issuance of financial card 17 depending on the amount of funds transferred (e.g. current pricing indicates that for amounts over $1,500.00 charges of between $25.00 to $45.00 (USD) could be passed onto recipient 14 while still keeping the cost below travellers cheques and wire transfers. Where an increased number of individuals utilize the fund transfer system, there will be additional profits from the associated increase in volume of merchant fees (due to additional merchant point purchases as a result of increased consumer confidence in financial card 17). Also, profits can be realized from related ATM fees due to an increased use of ATM machines for fund transfers. Finally, since applicable taxes are levies at the point of purchase for sender 12, concerns of issuance countries can be addressed.

Further, fund transfer system 10 can be utilized within a number of different user scenarios. Examples include the student whose parents wish to keep within a preset budget, the travelling executive put on a set budget by his company, the traveller who requires additional security and who wishes to pre-authorize fund transfer to himself at a destination point (i.e. destination airport), and a stranded traveller, shopper or victim of robbery of theft of personal ID. Accordingly, fund transfer system 10 provides a viable alternative to travellers cheques, credit/debit cards, and "wire" transfers, and allows any person to instantly and electronically transfer currency to any other person even in the case where neither person has a preestablished financial account with the organization, and which will still take advantage of an existing ATM network.

Fund transfer system 10 can specifically provide corporate users with the ability to provide financial management control for employees when travelling away from the office. Fund transfer system 10 allows a corporation to provide employees with the authority to buy and pay for goods and services remotely (i.e. by remotely issuing them cards of predetermined value) while providing direct contact with the financial computer systems at head office (i.e. transactional data could be specifically sent to the corporate computer system every time a purchase using financial card 17 is made etc.)

Specifically, the financial transactions of a company's employees can be monitored for real time inventory, distribution, and cash flow control purposes (i.e. to implement spending limits etc.) Accordingly, fund transfer system 10 provides a corporate client with the ability to remotely authorize fund transfers as well as to integrate employee transactions (buy/sell) in real time with the corporation's general ledger with a minimum of delay (i.e. for real time accounting and operations). The ability to control and track real-time spending incurred by travelling executives, salespeople and sports teams provides organizations with the ability to conduct immediate reconciliation of expenses through centralized head office accounting departments. Financial card 17 can also be beneficially used within various other types of organizations such as government supplied cards to persons on government programs or within the military where additional security and anonymity can be especially desirable.

It should be appreciated that further application of fund transfer system 10 may be made in the context of tracking missing cards. Specifically, financial card 17 could be provided by including a tracking Global Positioning System (GPS) receiver chip within financial card 17 that would allow for tracking once a card has been reported missing or stolen. It would also be possible to deactivate the stolen card and to reissue a replacement financial card 17 to recipient 14 as is conventionally known. The GPS tracking feature could also be used by default by an individual who wishes to track another individual (e.g. a parent who wants to know where the child is located) to provide an additional security feature.

It should be noted that financial card 17 could be "rechargeable" for reuse purposes. It is possible that issuers could institute a recycling program for reuse of cards whereby extra bonus points are offered when recipient 14 returns the card. Also, any odd remaining funds left on financial card 17 (i.e. low odd sums) may be converted into cash by the issuer.

Another feature of fund transfer system 10 is that financial card 17 can be considered "creditor proof". That is, once recipient 14 has been issued financial card 17, only recipient 14 can access the funds which are located on financial card 17.

As will ba apparent to those skilled in the art, various modifications and adaptations of the method and system described above are possible without departing from the present invention, the scope of which is defined in the appended claims.

I claim:

1. A financial transaction system for automated electronic transfer of funds comprising:
    an initiating regional office configured to automatically:
        receive a transfer request comprising an amount of funds and a verification ID protocol, comprising a question and answer combination, from a sender;
        receive a predetermined amount of funds from the sender from a financial card and hold the funds for the recipient; and
        send an initiating data packet comprising the verification ID protocol, the amount of funds, an initiating security ID, an initiating transit ID and a dispensing transit ID, to an initiating authorization center;
    the initiating authorization center configured to automatically:
        receive the initiating data packet from the initiating regional office;
        confirm the authenticity of the initiating security ID; and
        if authentic, send an authorization data packet, comprising the verification ID protocol, the amount of funds, an authorization security ID, the initiating transit ID and the dispensing transit ID to a dispensing authorization centre based on the dispensing transit ID;
    the dispensing authorization center configured to automatically:
        receive the authorization data packet from the initiating authorization center;
        verify the authenticity of the authorization security ID; and
        if authentic, send a dispensing data packet, comprising the verification ID protocol, the amount of funds, a dispensing security ID, the initiating transit ID and the dispensing transit ID to a dispensing regional office; and the dispensing regional office configured to automatically:
receive the dispensing data packet from the dispensing authorization center;
verify the authenticity of the dispensing security ID; and
if authentic, wait for a recipient to attend at the dispensing regional office;
when a recipient attends, conduct the verification ID protocol to confirm that the recipient is the correct recipient;
if confirmed, send a confirmation data packet, comprising the verification ID protocol, the amount of funds, a confirmation security ID, the initiating transit ID and the dispensing transit ID to the initiating regional office based on the initiating transit ID, wherein, based on the confirmation data packet, the initiating regional office transfers the predetermined amount of funds from the sender;
dispense the predetermined amount of funds to the recipient via an anonymous financial card, wherein the financial card comprises a processor, a memory, a GPS receiver chip, an LCD screen and at least one button for input of information to the financial card; and
activate the predetermined amount of funds on the financial card based on the entry of a PIN number by the recipient.

2. The financial system of claim 1, wherein said financial card is a credit card.

3. The financial system of claim 1, wherein said financial card is a debit card.

4. The financial system of claim 1, wherein said financial card is a smart card.

5. The financial system of claim 1, wherein said financial card is a stored value card.

6. The financial system of claim 1, wherein the initiating regional office is further configured to automatically receive a transaction fee from the sender.

7. A method for automated electronic transfer of funds comprising:
at an initiating regional office, automatically:
receiving a transfer request comprising an amount of funds and a verification ID protocol, comprising a question and answer combination, from a sender;
receiving a predetermined amount of funds from the sender from a financial card and holding the funds for the recipient; and
sending an initiating data packet comprising the verification ID protocol, the amount of funds, an initiating security ID, an initiating transit ID and a dispensing transit ID, to an initiating authorization center;
at the initiating authorization center, automatically:
receiving the initiating data packet from the initiating regional office;
confirming the authenticity of the initiating security ID; and
if authentic, sending an authorization data packet, comprising the verification ID protocol, the amount of funds, an authorization security ID, the initiating transit ID and the dispensing transit ID to a dispensing authorization centre based on the dispensing transit ID;
at the dispensing authorization center, automatically:
receiving the authorization data packet from the initiating authorization center;
verifying the authenticity of the authorization security ID; and
if authentic, sending a dispensing data packet, comprising the verification ID protocol, the amount of funds, a dispensing security ID, the initiating transit ID and the dispensing transit ID to a dispensing regional office; and
at the dispensing regional office, automatically:
receiving the dispensing data packet from the dispensing authorization center;
verifying the authenticity of the dispensing security ID; and
if authentic, waiting for a recipient to attend at the dispensing regional office;
when a recipient attends, conducting the verification ID protocol to confirm that the recipient is the correct recipient;
if confirmed, sending a confirmation data packet, comprising the verification ID protocol, the amount of funds, a confirmation security ID, the initiating transit ID and the dispensing transit ID to the initiating regional office based on the initiating transit ID, wherein, based on the confirmation data packet, the initiating regional office releases the predetermined amount of funds from the sender;
dispensing the predetermined amount of funds to the recipient via an anonymous financial card, wherein the financial card comprises a processor, a memory, a GPS receiver chip, an LCD screen and at least one button for input of information to the financial card; and
activating the predetermined amount of funds on the financial card based on the entry of a PIN number by the recipient.

8. The method of claim 7, further comprising receiving information from said sender specifying a physical location for recipient to attend.

9. The method of claim 7, further comprising the step of dispensing said financial card to the recipient through an ATM.

10. The method of claim 7, further comprising, at the initiating regional office, automatically receiving a transaction fee from the sender.

11. A financial transaction system for automated electronic transfer of funds comprising:
an initiating regional office configured to automatically:
receive a transfer request comprising an amount of funds and a verification ID protocol, comprising a question and answer combination, from a sender;
receive a predetermined amount of funds from the sender from a financial card and hold the funds for the recipient; and
send an initiating data packet comprising the verification ID protocol, the amount of funds, an initiating security ID, an initiating transit ID and a dispensing transit ID, to an initiating authorization center;
the initiating authorization center configured to automatically:
receive the initiating data packet from the initiating regional office;
confirm the authenticity of the initiating security ID; and
if authentic, send an authorization data packet, comprising the verification ID protocol, the amount of funds, an authorization security ID, the initiating transit ID and the dispensing transit ID to a dispensing authorization centre based on the dispensing transit ID;

the dispensing authorization center configured to automatically:
  receive the authorization data packet from the initiating authorization center;
  verify the authenticity of the authorization security ID; and
  if authentic, send a dispensing data packet, comprising the verification ID protocol, the amount of funds, a dispensing security ID, and the initiating transit ID to a dispensing regional office; and the dispensing regional office configured to automatically:
  receive the dispensing data packet from the dispensing authorization center;
  verify the authenticity of the dispensing security ID; and
  if authentic, wait for a recipient to attend at the dispensing regional office;
  when a recipient attends, conduct the verification ID protocol to confirm that the recipient is the correct recipient;
  if confirmed, send a confirmation data packet, comprising a confirmation security ID to the initiating regional office based on the initiating transit ID,
  wherein, based on the confirmation data packet, the initiating regional office transfers the predetermined amount of funds from the sender;
  dispense the predetermined amount of funds to the recipient via an anonymous financial card wherein the financial card comprises a tracking device, a display, and at least one input for inputting information to the financial card.

12. The financial system of claim 11, wherein the dispensing regional office is also configured to automatically activate the predetermined amount of funds on the financial card based on entry of an access code by the recipient.

13. The financial system of claim 11, wherein the tracking device is a GPS receiver chip.

14. The financial system of claim 11, wherein the display is an LCD screen.

15. The financial system of claim 11, wherein the input comprises at least one button.

* * * * *